United States Patent
Liguori et al.

(10) Patent No.: US 11,494,214 B2
(45) Date of Patent: Nov. 8, 2022

(54) VERIFIED ISOLATED RUN-TIME ENVIRONMENTS FOR ENHANCED SECURITY COMPUTATIONS WITHIN COMPUTE INSTANCES

(71) Applicant: Amazon Technologies, Inc., Seattle, WA (US)

(72) Inventors: Anthony Nicholas Liguori, Bainbridge Island, WA (US); Eric Jason Brandwine, Haymarket, VA (US); Matthew Shawn Wilson, Bainbridge Island, WA (US)

(73) Assignee: Amazon Technologies, Inc., Seattle, WA (US)

(*) Notice: Subject to any disclaimer, the term of this patent is extended or adjusted under 35 U.S.C. 154(b) by 359 days.

(21) Appl. No.: 16/368,747

(22) Filed: Mar. 28, 2019

(65) Prior Publication Data
US 2020/0310855 A1 Oct. 1, 2020

(51) Int. Cl.
*G06F 9/455* (2018.01)
*G06F 21/53* (2013.01)

(52) U.S. Cl.
CPC .......... *G06F 9/45558* (2013.01); *G06F 21/53* (2013.01); *G06F 2009/45587* (2013.01); *G06F 2221/2149* (2013.01)

(58) Field of Classification Search
None
See application file for complete search history.

(56) References Cited

U.S. PATENT DOCUMENTS

| 5,204,949 | A   | * | 4/1993  | Yasue ............... H04L 29/06 709/214 |
|-----------|-----|---|---------|------------------------------------------|
| 10,353,831 | B2 | * | 7/2019  | Robinson ........... G06F 12/145 |
| 2007/0050764 | A1 | * | 3/2007  | Traut ................ G06F 9/45558 718/1 |
| 2007/0239987 | A1 | * | 10/2007 | Hoole ............... H04L 67/1097 713/169 |
| 2013/0054948 | A1 |   | 2/2013  | Raj et al. |
| 2014/0053272 | A1 | * | 2/2014  | Lukacs ............. G06F 21/53 726/24 |
| 2014/0237464 | A1 | * | 8/2014  | Waterman .......... G06F 8/658 717/172 |
| 2015/0324215 | A1 | * | 11/2015 | Borthakur .......... H04L 43/0876 718/1 |
| 2016/0373474 | A1 | * | 12/2016 | Sood ................ G06F 21/50 |
| 2017/0024570 | A1 |   | 1/2017  | Pappachan et al. |
| 2017/0109187 | A1 | * | 4/2017  | Cropper ............ G06F 9/45558 |
| 2017/0244557 | A1 | * | 8/2017  | Riel ................ G06F 9/45558 |

(Continued)

OTHER PUBLICATIONS

International Search Report and Written Opinion from PCT/US2020/022889, dated May 19, 2020, pp. 1-13.

(Continued)

*Primary Examiner* — Meng Ai T An
*Assistant Examiner* — Zujia Xu
(74) *Attorney, Agent, or Firm* — Robert C. Kowert; Kowert, Hood, Munyon, Rankin & Goetzel, P.C.

(57) ABSTRACT

At a virtualization host, an isolated run-time environment is established within a compute instance. The configuration of the isolated run-time environment is analyzed by a security manager of the hypervisor of the host. After the analysis, computations are performed at the isolated run-time environment.

20 Claims, 10 Drawing Sheets

(56) References Cited

U.S. PATENT DOCUMENTS

| | | |
|---|---|---|
| 2018/0095771 A1* | 4/2018 | Warkentin ............ G06F 9/4416 |
| 2018/0114000 A1 | 4/2018 | Taylor |
| 2018/0159771 A1* | 6/2018 | Malloy ................. H04L 45/745 |
| 2018/0239638 A1* | 8/2018 | Inami ..................... G06F 9/4881 |
| 2019/0097971 A1* | 3/2019 | Coleman ............. H04L 63/0281 |
| 2019/0268318 A1* | 8/2019 | Tsirkin ................. G06F 21/572 |

OTHER PUBLICATIONS

Fengzhe Zhang, "CloudVisor: Retrofitting Protection of Virtual Machines in Multi-tenant Cloud with Nested Virtualization", dated Oct. 23-26, 2011, pp. 1-14.
Min Zhu et al, "HA-VMSI: A Lightweight Virtual Machine Isolation Approach with Commodity Hardware for ARM", dated Apr. 8-9, 2017, pp. 1-15.
Paul Sangster et al, "Virtualized Trusted Platform Architecture Specification", dated Sep. 27, 2011, pp. 1-60.
U.S. Appl. No. 15/199,479, filed Jun. 30, 2016, Anthony Nicholas Liguori et al.
AMD, "Secure Encrypted Virtualization API Version 0.16 Technical Preview", Advanced Micro Devices, Publication 55766, Revision 3.06, Feb. 2018. pp. 1-99.
Ittai Anati, et al., "Innovative Technology for CPU Based Attestation and Sealing", Retrieved from https://software.intel.com/en-us/articles/innovative-technology-for-cpu-based-attestation-and-sealing on Feb. 9, 2019, pp. 1-19.

* cited by examiner

VERIFIED ISOLATED RUN-TIME ENVIRONMENTS FOR ENHANCED SECURITY COMPUTATIONS WITHIN COMPUTE INSTANCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment.

In many cases, virtualized resources may be used for applications that access or manipulate sensitive information. For example, financial applications, medical applications and the like may all deal with data sets that are intended to be kept confidential. Security-related artifacts such as cryptographic keys, digital certificates and the like may be utilized to ensure confidentiality and privacy of some applications.

Figure 1:
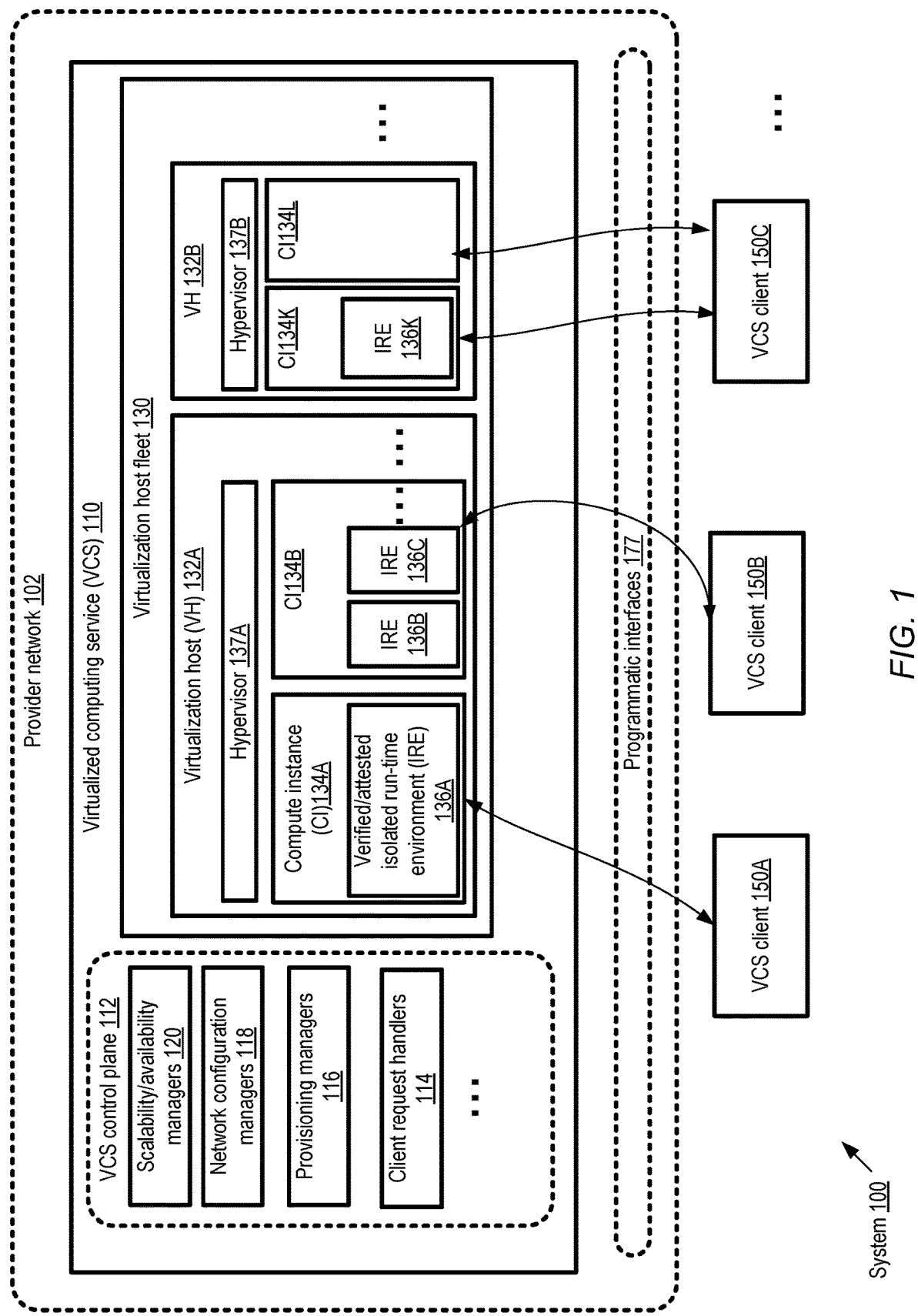
FIG. 1 illustrates an example system environment in which isolated run-time environments with verified software configurations may be set up using a subset of resources allocated to compute instances of a virtualized computing service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for implementing isolated run-time environments with verifiable software configurations for sensitive or enhanced-security computations within compute instances (such as guest virtual machines) of a virtualized computing service. Such run-time environments may be set up, for example, on behalf of clients of a virtualized computing service to enable computations that use security artifacts (such as cryptographic keys) to be performed at the service using easy-to-use programmatic interfaces, without having to use special purpose security hardware or non-standard programming techniques, while reducing or minimizing the probability of compromise of the security artifacts. Clients of the virtualized computing service (VCS) may already be using compute instances for many types of applications, so extending the compute instances' capabilities to support isolated run-time environments (IREs) may enable clients to continue to use familiar interfaces while significantly enhancing application security. The probability of compromise or "leakage" of the security artifacts may be reduced in various embodiments with the help of one or more components of virtualization management software (e.g., a security manager and/or a resource segregation manager within a hypervisor) as well as intermediary communication processes (CIPs) set up within the compute instances. In some cases IREs may be used for tasks that do not necessarily require the use of keys or other security artifacts. In some embodiments, a VCS client may simply ensure that the configuration of an IRE has been verified using techniques described herein, and then utilize the IRE to perform the desired tasks—e.g., to run a specific program included in the IRE with a particular input data set and obtain the corresponding result.

According to at least some embodiments, a system may comprise one or more computing devices of a virtualized computing service of a provider network (e.g., a public cloud computing environment). The computing devices may include instructions that when executed on or across one or more processors cause the devices to launch a compute instance (CI) at a virtualization host or server. Any of several types or categories of compute instances may be set up in different embodiments, including for example guest virtual machines, bare metal instances which directly access some of the host's hardware, and so on. A set of resources, including a section of memory of the host, may be allocated for use by the compute instance in various embodiments, e.g., by a virtualization management component running at the host. In at least some embodiments, the virtualization management components of the host may include a hypervisor which acts as an intermediary between the compute instances and at least some of the physical hardware devices of the host, and the hypervisor may participate in the allocation of some or all of the resources of the compute instance. In some embodiments, some virtualization management tasks may be offloaded from the primary processors or CPUs of the host; for example, one or more virtualization management offload cards linked to the CPUs via a peripheral interconnect may be used to implement some types of virtualization management tasks (including, in some cases, allocation of memory for compute instances, networking-related tasks, storage-related tasks and the like).

At the virtualization host, a subset of resources that were allocated for the compute instance may be segregated or set aside for exclusive use by an isolated run-time environment (IRE) established within, and tightly coupled with, the compute instance in some embodiments. For example, if K gigabytes of memory were designated for the compute instance, a section of memory comprising L gigabytes, where L<K, may be carved out (e.g., by a virtualization management component of the host) for the isolated run-time environment, such that the compute instance can only access the remaining (K−L) gigabytes during the lifetime of the isolated run-time environment. In such an embodiment, the contents of the memory segregated for the IRE may not be visible from any programs or processes that are outside (i.e., not part of) the IRE itself. Other types of resources, such as virtualized processors, may also be set aside for the IRE in some embodiments, reducing the amount of usable resources of that type that remain available for the compute instance. The compute instance may be referred to as a "parent" compute instance in some embodiments, and the IRE may be referred to as a "child" run-time environment of the parent compute instance. IREs may also be referred to as "private software enclaves" or "virtualized enclaves" in some embodiments. In various embodiments, a number of constraints regarding interactions with other entities may be enforced on an IRE—e.g., network communications with endpoints outside the virtualization host may be prohibited, processes running within the IRE may not be granted access to persistent storage devices or file systems, and so on.

In at least some embodiments, a communication intermediary process (CIP) (or an intermediary agent comprising one or more processes) may be established within the compute instance for interactions with the IRE. In some implementations a section of shared memory which is mapped within respective address spaces of the IRE and the compute instance may be used as a local communication channel between the CIP and the IRE. In at least some embodiments, a bi-directional notification based mechanism may be used for communications between the CIP and the IRE. In contrast to techniques which involve polling, an interrupt-driven approach may be used for communications between the CIP and the IRE in such embodiments. In other embodiments, a polling technique may be employed.

The virtualization host may comprise a security manager, e.g., comprising one or more processes running within the hypervisor in some embodiments. The security manager may measure, analyze or verify the software configuration of the IRE, e.g., in response to a request from a client of the VCS, and provide a result of its measurements, analysis or verification to the client. In some embodiments, the query may be sent to the compute instance by the client (or by some other entity selected/authorized by the client), and the CIP may transmit an internal version of the query to one or more processes within the IRE; the IRE may then interact with the security manager to enable measurements or analysis of the IRE software stack to be performed. Any appropriate software verification or attestation tests/techniques may be employed in different embodiments, including for example generating a hash value representing the installed software of the IRE which can be compared with a set of hash values representing respective acceptable software configurations. In at least some embodiments, the response provided by the security manager may include evidence of the identity of the security manager (e.g., a digital certificate rooted via a certificate chain to an authority trusted by the client), evidence of the identity of the IRE, and/or other elements such a random number or nonce that was included in the query sent by the client.

If the VCS client is satisfied that the result of the verification/attestation is being provided by a trusted party (the security manager), and the result of the verification analysis or attestation of the IRE is acceptable to the VCS client, in various embodiments a secure communication channel (similar in concept to a TLS (Transport Layer Security) session) may be established between the client and the IRE. Such a channel or session may utilize the CIP as an intermediary, in that encrypted messages prepared at the IRE or the client may be passed on to the client or the IRE by the CIP. Using such a channel, an encrypted application security artifact, such as a cryptographic key to be used to later perform computations on behalf of the client at the IRE, may be obtained at the IRE. The security artifact may be decrypted at the IRE in various embodiments. Note that although the CIP may assist in the transmission of messages between the client and the IRE via the secure channel, the security artifact may be encrypted using a shared secret inaccessible to the CIP in such embodiments; as such, the decrypted version of the security artifact may not be available at the CIP or any other process or program running outside the IRE at the virtualization host. After the security artifact is obtained, the IRE may perform computations using the security artifact at the client's request, and results of the computations may be provided from the IRE (via the CIP) to any desired destination in various embodiments. As a result of the various constraints placed on IRE communications, and the techniques used to verify the trustworthiness of the IRE, the probability that the security artifacts are misused or compromised may be substantially reduced in various embodiments; for example, even a user that has root or administrator privileges with respect to the parent compute instance of the IRE may not be able to access or obtain the un-encrypted security artifact in at least some embodiments. As a result, various types of applications accessing sensitive data may be run safely using IREs in such embodiments, including so-called "blinded execution" applications in which algorithms are executed using sensitive data at IREs such that programs or processes of the parent compute instance only have access to inputs and outputs of the algorithms, and do not have access to the sensitive data itself. In some scenarios, while a VCS client may verify the trustworthiness of an IRE with the help of a security manager as discussed above, the transmission of a security artifact via a secure communication channel may not be required for the applications to be run at the IRE. Instead, after the configuration of the IRE has been checked and found satisfactory, in some embodiments a client may simply utilize the IRE to run a desired application which does not require a security artifact or a secure communication channel of the kind described above.

As one skilled in the art will appreciate in light of this disclosure, certain embodiments may be capable of achieving various advantages, including some or all of the following: (a) substantially enhancing the security of applications that deal with sensitive or confidential data and are run at virtualized computing services, (b) reducing the amount of processing and/or networking resource usage associated with recovery operations (such as revocations of digital certificates, re-generation and re-distribution of encryption keys etc.) resulting from compromises of security artifacts, and (c) improving the use experience of clients of virtualized computing services, as well as administrators of applications that are run at such services, by providing clearer insights into the resources used specifically for sensitive data computations.

The virtualized computing service may implement a set of programmatic interfaces that can be used by clients to submit requests associated with IREs in various embodiments. Such interfaces may include, for example, one or more web-based consoles, application programming interfaces (APIs), command-line tools, graphical user interfaces and the like. Using such interfaces, in one embodiment a VCS client may submit a request to launch a compute instance that comprises an IRE—that is, a request to launch a compute instance may also include parameters that indicate that an IRE should be set up. In other embodiments, a compute instance may be set up in response to a first programmatic request, and then an IRE may be instantiated later within the compute instance in response to a second programmatic request. In some embodiments, programmatic interfaces of the VCS may be used to specify various details of an IRE—e.g., a virtual machine image to be used for an IRE (distinct from the machine image used for the parent compute instance) may be indicated programmatically, a software container to be used for an IRE may be specified programmatically, programs to be run within the IRE, and so on. A variety of programmatic models may be supported for IREs in some embodiments, including a model in which a library operating system is combined with a unikernel, a model in which industry standard software containers may be used at or for IREs, and so on.

In at least some embodiments, one or more parameters specified by a VCS client or chosen at the VCS control plane (the administrative components of the VCS) may limit the lifetime of an IRE—e.g., an IRE may be terminated or shut down T minutes after it is instantiated. Such constraints imposed on IRE lifetimes may further reduce the likelihood that security artifacts made available to the IRE are compromised or acquired by entities other than the intended recipients or users of the security program. In at least some embodiments, several different IREs may be set up using the resources of a given compute instance, e.g., with differing amounts of memory and/or other resources allocated for exclusive use by individual ones of the IREs. Individual ones of the IREs in such embodiments may be used for respective distinct applications dealing with sensitive data, for example.

In at least one embodiment, either in response to a client request or based on analysis of metrics collected at the VCS, a compute instance that comprises one or more IREs may be migrated to a different virtualization host, such as a host that has more memory or more computing capacity than the initial host that was used for the compute instance. In such an embodiment, the IREs may be migrated along with the parent compute instance, and the amount of resources allocated for the compute instance and/or for the IREs may differ on the new host than on the original host in some cases. For example, in one scenario, the total amount of memory allocated to the parent compute instance may be increased by G gigabytes after the migration, and the total amount of memory segregated for the IRE may also be increased by up to G gigabytes after the migration. In at least some embodiments, the programmatic interfaces of the VCS may be used to obtain metrics associated with IREs—e.g., the amount of memory used at various IREs, measures of CPU utilization of the IREs, the amount of data transferred in and out of the IREs, etc., may be made available to authorized VCS clients.

Example System Environment

FIG. 1 illustrates an example system environment in which isolated run-time environments with verified software configurations may be set up using a subset of resources allocated to compute instances of a virtualized computing service, according to at least some embodiments. As shown, system 100 comprises various resources of a virtualized computing service (VCS) 110 of a provider network 102, including a virtualization host fleet 130 and a set of administrative components collectively referred to as the VCS control plane in the depicted embodiment. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in various embodiments. Provider networks may also be referred to as "public cloud" environments in some embodiments. A given provider network may include numerous data centers hosting various resource pools, such as collections of physical and/or virtualized compute servers, storage devices, networking equipment and the like, needed to implement, configure and distribute the infrastructure and services offered by the provider.

The VCS 110 may implement one or more programmatic interfaces 177, including for example one or more web-based consoles, a collection of application programming interfaces (APIs), command line tools, graphical user interfaces and the like. Such interfaces may be utilized by VCS clients 150, such as clients 150A-150C, to request various types of configuration operations, receive corresponding responses and the like. For example, clients 150 may submit programmatic requests to launch or instantiate compute instances (CIs) 134, such as CIs 134A, 134B, 134K and 134L, and/or to set up isolated run-time environments (IREs) 136 (e.g., IRE 136A, 136B, 136C or 136K) using interfaces 177. Individual ones of the compute instances 134 may comprise respective virtual machines and/or other types of program execution platforms (such as bare-metal instances with direct control granted to more hardware devices than is granted to guest virtual machines) in various embodiments.

In some embodiments, at least some types of client requests for launching compute instances may be directed to the VCS control plane 112. The control plane 112 may comprise a number of subcomponents, including one or more client request handlers 114, provisioning managers 116, network configuration managers 118, scalability/availability managers 120 and the like, individual ones of which may respectively be implemented using some combination of hardware and software at one or more computing devices in the depicted embodiment. A client's request for a compute instance may be processed initially at a request handler 114. The request may perform some initial checking (e.g., to verify that the client has permissions for the kinds of operations being requested), and then pass on internal versions of the request to one or more other components of the control plane for implementation. The provisioning managers 116 may, for example, be responsible for identifying a specific virtualization host (VH) 132, such as VH 132A or 132B, at which one or more requested compute instances are to be launched in the depicted embodiment. Network configuration managers 118 may be responsible for setting up connectivity between the compute instances 134 and other entities inside and outside the provider network 102 in various embodiments, including for example connectivity with storage services and/or other services (not shown in FIG. 1) of the provider network. Scalability and availability managers 120 may be responsible for automatically modifying the configurations of compute instances and other resources, e.g., based on load balancing considerations, increases or decreases in workloads, and so on. In some embodiments, the control plane 112 may also include migration managers that transfer compute instances (along with their isolated run-time environments) between virtualization hosts, e.g., based on analysis of collected metrics and/or based on requests from VCS clients.

Individual ones of the virtualization hosts (VHs) 132 may comprise a respective collection of virtualization management components, including for example hypervisor 137A at VH 132A and hypervisor 137B at VH 132B. Such hypervisors 137 may act as intermediaries between the compute instances 134 and at least some of the hardware elements of the VHs, including for example physical processors (e.g., central processing units (CPUs), graphical processing units (GPUs), etc.), memory, persistent storage devices, networking cards, peripheral devices and the like. In some embodiments, at least a portion of virtualization management responsibilities may be offloaded from the hypervisor to a hardware card (e.g., a card linked to the CPUs of the host via a Peripheral Connect Interface or PCI-Express interconnect) in order to free up more of the computing capacity of the primary processors of the host for compute instances.

After a request to launch a compute instance 134 is sent by a client 150 to the VCS control plane 112, a corresponding internal command to launch the instance may be transmitted to a virtualization management component (e.g., the hypervisor 137, or an offloaded virtualization management component) running at a selected virtualization host 132 of fleet 130 in the depicted embodiment. A set of resources, including a section of the virtualization host's memory, may be allocated to the compute instance 134 by the virtualization management component. In some embodiments, the client request and/or the internal command may also indicate that one or more isolated run-time environments (IREs) 136 are to be set up at the compute instance. In other embodiments, a separate request and/or command may be transmitted to the virtualization host, e.g., after a compute instance 134 has already been set up, to instantiate an IRE 136 using some of the resources designated for the compute instance 134. At least a portion of the memory allocated to the compute instance may be segregated or set aside for an IRE 136 by a hypervisor 137 in some embodiments. The compute instance 134 whose resources are used for the IRE 136 may be referred to as the "parent" compute instance of the IRE, and the IRE may be referred to as a child or dependent run-time environment, logically tightly linked to the parent compute instance. Thus, for example, IRE 136A may be set up with CI 134A as its parent, CI 134B may be configured as the parent compute instance of IREs 136B and 136C, and CI 134K may be the parent compute instance of IRE 136K. Note that not all compute instances at the VHs 132 of the VCS 110 may necessarily have child IREs in the depicted embodiment: for example, CI 134L running at VH 132B may not include an IRE. In at least some embodiments, a variety of compute instance types or categories may be supported at the VCS 110, with some categories enabling IREs to be established if desired at individual instances, and other categories that do not support IRE instantiation. As indicated in FIG. 1, resources of a given virtualization host 132 (such as 132A and 132B) may be used for multiple compute instances in at least some embodiments, some of which may be set on behalf of different VCS clients. For example, VH 132A has two compute instances: CI 134A set up on behalf of client 150A, and CI 134B set up on behalf of client 150B. Other virtualization hosts, such as 132B, may comprise one or more compute instances set up on behalf of a single client (e.g., client 150C). Furthermore, respective subsets of resources allocated to a given compute instance may be segregated or carved out for multiple IREs 136 in some scenarios (as in the case of CI 134B, which is the parent of both IRE 136B and IRE 136C). In at least some embodiments, the lifetimes of individual IREs 136 and their parent compute instances (or their peer IREs at the same compute instance) may differ—e.g., it may be the case that IRE 136A is terminated before CI 134A, or that IRE 136B is terminated before IRE 136C in the example scenario shown in FIG. 1. The resources of the parent compute instance that are segregated or set aside for an IRE may not be accessible to programs or processes running at the parent compute instance in at least some embodiments—for example, if 4 gigabytes of a total of 32 gigabytes of memory that was originally allocated to CI 134A is set aside for IRE 136A, programs/processes within CI 134A may only be able to access and use the remaining 28 gigabytes while IRE 136A remains in existence.

When configuring or instantiating an IRE 136, in various embodiments a number of constraints may be enforced to limit the manner in which programs or processes within the IRE can communicate or interact with other entities (e.g., processes/programs running in the parent compute instance, or outside the parent compute instance). In at least one embodiment, for example, an IRE process/program may be prohibited from over-the-wire networking communications with any entities outside the IRE (e.g., by not configuring virtual or physical network interfaces accessible the IRE). Similarly, in various embodiments, IREs 136 may be configured such that access to persistent storage devices and/or file systems is prohibited—that is, processes/programs within an IRE 136 may not be able to perform reads or writes to persistent storage. In some embodiments, one or more communication intermediary processes (CIPs) or daemons may be instantiated in the parent compute instance of an IRE, which are permitted to use a local communication channel to communicate with the IRE on behalf of other processes/programs inside or outside the parent compute instance. For example, in some embodiments one or more buffers of shared memory, mapped to both a CIP and an IRE, may be used for such communications. In at least some such embodiments, an interrupt-based or notification-based communication technique may be used for bidirectional communications between a CIP and an IRE—e.g., a notification may be generated by the CIP when a message is ready for the IRE, and similar notifications may be used to indicate when the IRE has finished reading the buffers, when the IRE has an outbound message ready in a buffer, when the CIP has finished transmitting that outbound message, and so on. In some embodiments, such a communication mechanism may be referred to as a "doorbell" mechanism.

In at least some embodiments, a virtualization management component of a VH 132, such as a hypervisor 137, may comprise a security manager responsible for verifying or measuring the software configuration of an IRE 136. For example, a client 150 may submit a verification query directed to an IRE 136, which may eventually be obtained at the security manager. In one example pathway for such a request, the verification request may be obtained at the communication intermediary process (CIP), which may pass it on to the IRE via a local communication channel, and the IRE may in turn notify the security manager regarding the query. The security manager may perform measurements and/or an attestation of the software stack of the IRE, and the results of such configuration verification or analysis operations may be provided to the query submitter in various embodiments. In at least one embodiment, one or more hash functions may be applied to the installed software of the IRE by the security manager, and a result of the hash functions may be compared with hash results of acceptable configurations by the client. Evidence that the security manager itself can be trusted (such as a digital certificate identifying the security manager), as well as a unique identifier of the IRE 136 and/or its parent compute instance may also be provided in response to a configuration verification query in at least some embodiments. In at least one embodiment a client may submit queries for analyzing the configuration of a given IRE several different times during the lifetime of the IRE, as desired, and receive respective results of the analysis performed in response to each query by the security manager.

After the client on whose behalf the IRE is established is satisfied regarding the trustworthiness of the IRE, one or more security artifacts (e.g., cryptographic keys that are to be used for computations of one or more applications on behalf of the client at the IRE) may be securely transmitted if needed to the IRE in various embodiments. A mechanism that does not allow unencrypted versions of the security artifacts to be intercepted or accessed by any parties other than the client supplying the artifact and the IRE itself may be employed in such embodiments. In some embodiments, for example, the logical equivalent of a TLS (Transport Layer Security) session may be set up between a client and the IRE, and the security artifacts may be encrypted using a shared secret key determined/generated by both the IRE and the client during the session. Note that even though the encrypted version of an artifact may pass through the communication intermediary process (CIP) on its way to the IRE from the client, the CIP may not have the shared secret key needed to decrypt the artifact in various embodiments. The decrypted version of the artifact may be generated within the IRE using the shared secret key in at least some embodiments.

After the security artifact(s) have been obtained within the IRE, requests to perform computations on behalf of the client using the artifact(s) may be conveyed to the IRE by the CIP, e.g., from other processes/programs within the parent compute instance in various embodiments. Consider an example scenario in which portions or all of a digital media object (such as a video or an audio recording) are to be transformed or processed using a security artifact on behalf of a media distribution application. A request to perform the transformations may be passed to the IRE from an application process running in the parent compute instance, along with the digital media object itself, via the CIP in this example scenario. The transformations may be implemented at the IRE using the security artifact, and the results may be provided to the application process via the CIP. In this example scenario, the security artifact may be used within the IRE to achieve the computation objectives of the application, without ever being exposed to any other processes or programs outside the IRE at the virtualization host. In at least some embodiments, after the secure computations needed from an IRE are completed, the IRE may be terminated, and the resources that were earlier segregated away from the parent compute instance may be returned to the parent compute instance.

Example Setup Operations for Isolated Run-Time Environments

Figure 2:
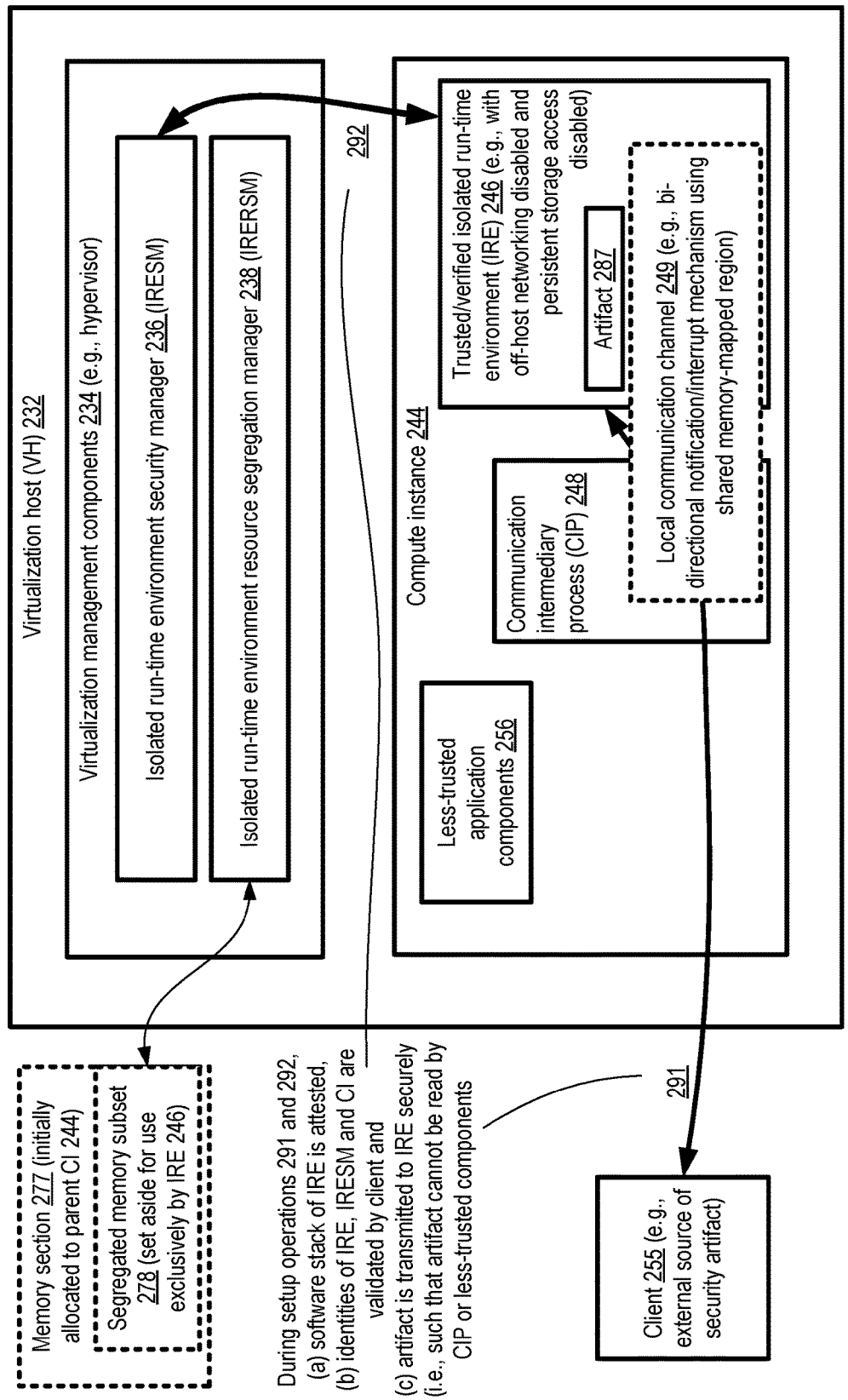
FIG. 2 illustrates an overview of example interactions for verifying the configuration of an isolated run-time environment at a compute instance of a virtualization host, according to at least some embodiments.

FIG. 2 illustrates an overview of example interactions for verifying the configuration of an isolated run-time environment at a compute instance of a virtualization host, according to at least some embodiments. In the depicted embodiment, a client 255 may submit a request to instantiate a compute instance at which an IRE may be established, e.g., to the control plane of a virtualized computing service (VCS) similar to VCS 110 of FIG. 1, resulting in the establishment of compute instance 244 on a virtualization host 232. Either based on parameters of the request to launch the compute instance, or based on a separate programmatic request, an isolated run-time environment (IRE) 246 may be set up in various embodiments, with some of the resources that were earlier allocated to the compute instance 244 (the "parent" compute instance of the IRE) being carved out or segregated for exclusive use by the IRE. In at least some embodiments, a client may indicate at least a portion of the desired software stack to be used at the IRE, e.g., by providing a virtual machine image, by selecting from a set of software stacks supported by the VCS, and so on. Virtualization management components 234 of the virtualization host 232 may include an IRE resource segregation manager (IRERSM) 238 responsible for identifying resources to be configured for exclusive use by the IRE (by threads or processes launched within the IRE) in at least some embodiments. For example, from the memory section 277 initially allocated to the parent compute instance 244, the IRERSM 238 may select or identify a memory subset 278 for exclusive use by the IRE; as and when additional IREs are set up within the same parent CI, the IRERSM 238 may set aside respective additional subsets exclusively for such IREs. The segregated memory may not be accessible to processes/programs running within the parent CI after it has been configured for IRE use in such embodiments. A subset of other resources, such as virtual CPUs that may have been designated for use by the parent compute instance 244, may also be designated for exclusive use by the IRE in some embodiments.

Within the compute instance, a communication intermediary process (CIP) 248 may be instantiated in various embodiments. An operating system daemon may be used as the CIP in some embodiments. In one embodiment, such a CIP daemon may be established as part of the procedure of establishing the IRE 246; in other embodiments, the CIP daemon may be started up as part of the initialization or boot sequence of the parent compute instance 244, or in response to invocation of an API after the compute instance has booted. The CIP 248 may be configured to transfer data to the IRE 246 from any other entities that wish to communicate with the IRE (e.g., including the client 255), and to transfer outbound data from the IRE 246 to one or more destinations (e.g., including the client 255) in various embodiments. As part of the configuration steps to ensure the isolation of the IRE from any external entities (e.g., other than the hypervisor 234), processes/programs of the IRE 246 may not be permitted to transfer data to any entity or endpoint over a network connection that uses a network interface card of the virtualization host in at least some embodiments; all communications to/from the IRE may have to pass through the CIP in such embodiments. Similarly, in some embodiments configuration settings of the IRE 246 may also prohibit interactions between the IRE and persistent storage, and between the IRE 246 and a file system in such embodiments—that is, reads from and writes to persistent storage may not be permitted from processes/programs of the IRE. A local communication channel 249 may be set up for data transfers between the CIP and the IRE in at least some embodiments. For example, a portion of shared memory which is accessible to both the CIP and the IRE may be designated to store data being transferred in/out of the IRE in one embodiment. A bi-directional notification or interrupt-based mechanism may be used to indicate when data is ready to be read by the IRE (for data inbound to the IRE) or read by the CIP (for data outbound from the IRE) in some embodiments. The compute instance 244 may comprise various other processes/programs such as application components 256 and/or operating system components of the compute instance, which may be less trusted (from the perspective of the client) than the IRE with respect to performing computations using security artifacts such as cryptographic keys in the depicted embodiment.

In at least some embodiments, to verify the trustworthiness of the IRE 246, a client 255 (e.g., an external source of a security artifact to be used at the IRE for computations) may issue a configuration verification query, e.g., to the VCS control plane or to the compute instance 244 as indicated by arrow 291. The query may, for example, include a random number or nonce in the depicted embodiment; the client 255 may later confirm that the same nonce is included in a response to the query. The query may be received at the CIP 248, which may in turn pass on the query to the IRE. An IRE security manager (IRESM) 236 may determine that the query has been directed to the IRE 246, e.g., based on an indication provided by the CIP 248 or the IRE 246. The IRESM 236 may then perform configuration verification/analysis operations on the software stack of the IRE 246, as indicate by arrow 292. In some embodiments, for example, one or more hash functions may be applied to various layers of the software of the IRE 246, and the output hash values may represent a signature of the software stack. In at least some embodiments, the IRESM 236 may perform attestation of the IRE software stack. The results of the configuration measurements/verification tests employed by the IRESM 236 may be provided to the client 255 in the depicted embodiment, e.g., via a reverse traversal of the path taken by the query submitted from the client 255. The results may be passed from the IRESM to the IRE, from the IRE to the CIP, and eventually to the client in such a scenario. In other embodiments, a different path may be used for the verification results than was used for the query. In at least some embodiments, in addition to the attestation/verification results and the nonce, the client 255 may also be provided (a) an indication of the identity of the IRESM, similar to a TLS certificate rooted at a trusted certificate authority and (b) an indication of the identity of the IRE and/or its parent compute instance (e.g., comprising one or more public keys of respective asymmetric key pairs). The client 255 may then verify that the attestation results and the identity information is acceptable, and if so, the IRE may be designated as being trusted and verified for computations that use one or more of the client's security artifacts. In some embodiments, the client may provide one or more hash values representing acceptable software configurations to the VCS, and the security manager may compare the results of its analysis of the IRE software with such acceptable hash values on the client's behalf; that is, the hash-value-based verification of the IRE software state may be performed at the hypervisor itself in such embodiments.

Figure 3:
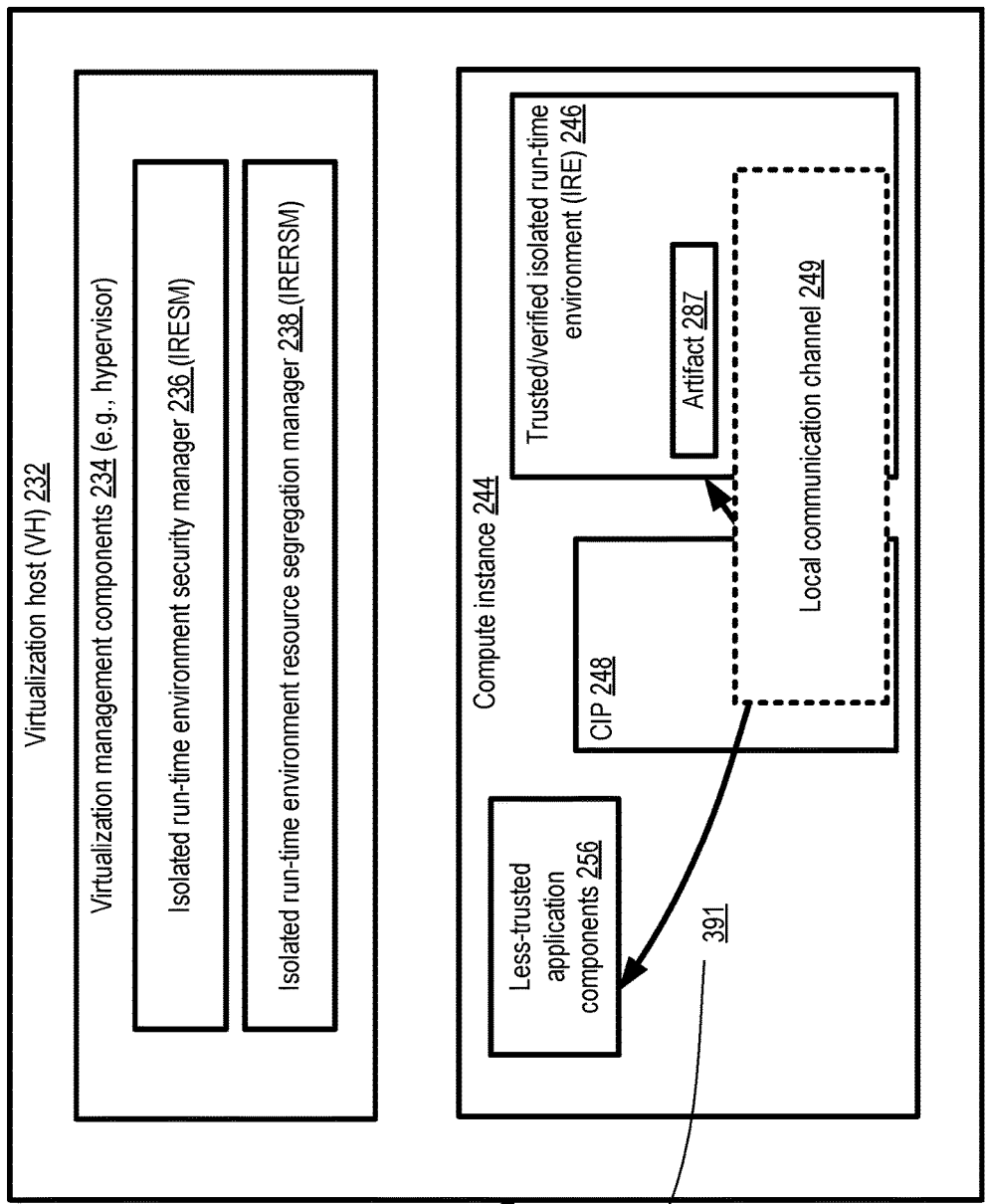
FIG. 3 illustrates an overview of an example request/response workflow for computations performed at an isolated run-time environment using a security artifact, according to at least some embodiments.

At this stage of the workflow illustrated in FIG. 2, one or more security artifacts 287 may have to be transferred from the client (or from some other source selected by the client) to the IRE for some types of applications. In order to do so, a secure communication session or channel, similar to a TLS session, may be established between the client (or artifact source) and the IRE in various embodiments. Within the compute instance 244, the CIP and local communication channel 248 may be used for such a secure session. Using one or more messages of the session, an encrypted version of the security artifact(s) 287, which cannot be decrypted by the CIP even though the CIP passes on the messages of the session to/from the IRE, may be transferred safely to the IRE 246. The IRE 246 may then begin performing computations using the artifact(s) 287, as illustrated in FIG. 3. In some cases, security artifacts 287 may not be needed for at least some of the applications run at an IRE.

Example Workflow for Computations Performed at Isolated Run-Time Environments

FIG. 3 illustrates an overview of an example request/response workflow for computations performed at an isolated run-time environment using a security artifact, according to at least some embodiments. After setup operations similar to those discussed in the context of FIG. 2 are completed, in which a VCS client verifies that an isolated run-time environment (IRE) has the appropriate software configuration for the client's application, and security artifacts to be used to perform computations of the application on behalf of the client are provided to the IRE without being made visible or accessible to other software running at the virtualization host, the IRE may be ready to perform the computations.

In at least some embodiments, components of the client's application which do not need to access the security artifacts may also be run at the parent compute instance 244. Such less-trusted components 256 may, for example, have access to data sets on which the subsets of the application's computations that require the use of a security artifact 287 are to be performed. The less-trusted components 256 may in some cases also be responsible for obtaining results of the IRE's computations, for further processing or analysis locally, and/or for transferring to some external endpoint. In at least some embodiments, a request-response workflow corresponding to arrow 391 may be implemented at the compute instance 244, in which the application components submit requests for computations to the IRE 246 (via the CIP 248 and the local communication channel 249), the IRE performs the requested computations using the security artifact 287, and the results of the computations are provided to the application components 256. The data sets (if any) on which the computations are to be performed may also be provided to the IRE via the local communication channel 249 in various embodiments. For example, if some type of transformation or extraction operations are to be performed on a digital media object (such as a video or an audio file) using a cryptographic key, the digital media object may be conveyed to the IRE 246 via the local communication channel, and the results of the transformation/extraction may be conveyed back to the application components 256 via the local communication channel as well in at least some embodiments. In scenarios in which large data sets have to be transferred from the less-trusted application components 256, the use of in-memory mechanisms (such as the buffers mentioned earlier) for the local communication channel 249 may enable very high transfer bandwidths and very low transfer latencies, especially when compared to the bandwidth and/or latencies achievable if the data sets were transferred over network connections. Note that other models of performing secure computations at the IRE may be employed in some embodiments—e.g., clients may submit requests for at least some computations from remote devices instead of relying on local application components 256, or programs/processes included in the IRE software stack may perform application computations as soon as the artifact 287 is obtained, without requiring any additional requests or data sets to be submitted.

Example Programmatic Interactions

Figure 4:
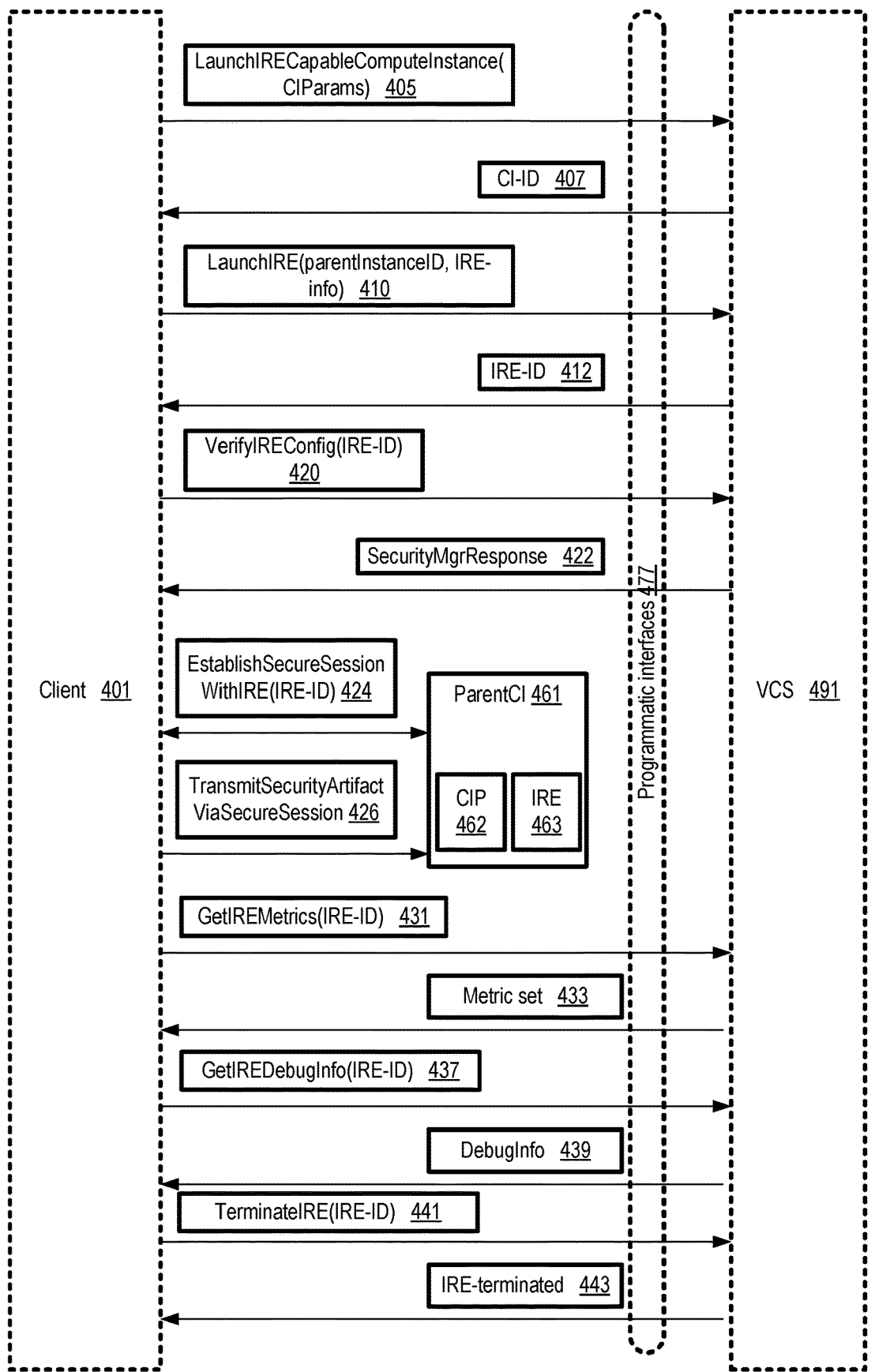
FIG. 4 illustrates example programmatic interactions related to the configuration and use of isolated run-time environments, according to at least some embodiments.

FIG. 4 illustrates example programmatic interactions related to the configuration and use of isolated run-time environments, according to at least some embodiments. In the depicted embodiment, a virtualized computing service (VCS) 491, similar in features and functionality to VCS 110 of FIG. 1, may implement programmatic interfaces 477 such as web-based consoles, APIs, command line tools, graphical user interfaces and the like usable by clients 401 to submit various types of requests and receive corresponding responses.

In some embodiments, a two-step approach may be employed with regard to instantiating or launching isolated run-time environments or IREs. A client 401 may first submit a request to launch a parent compute instance (e.g., a LaunchIRECapableComputeInstance request 405) to the VCS 491, and then later issue a request to launch the IRE itself (e.g., a LaunchIRE request 410) within the parent compute instance (CI). In such an approach, various desired characteristics of the parent compute instance may be indicated in the first of the two requests (e.g., via the CIParams of request 405). After the VCS has launched a CI with the requested properties, an identifier CI-ID 407 of the compute instance may be provided to the client. That CI identifier may be included in the request 410 to launch the IRE in the depicted embodiment, e.g., along with information (IRE-info) about the contents and configuration of the IRE itself, such as the amount of the parent CI's memory and/or other resources to be set aside for the IRE. In some embodiments a pointer to an executable object such as a virtual machine image or a software container executable to be used in the IRE may be provided as a parameter of the LaunchIRE request. In at least one embodiment, a program to be launched as the IRE may be transferred to the parent compute instance by the client 401 before the LaunchIRE request is submitted, and an indicator of the name or location of the program may be provided in the IRE-info parameter. An identifier of the IRE (IRE-ID 412) may be returned to the client after the IRE is instantiated in some embodiments. In other embodiments, instead of a two-step IRE establishment procedure, a single request may be used to launch both the parent compute instance and the child IRE within the parent compute instance, in effect combining the requests 405 and 410 into a single request, whose response may include identifiers of the parent compute instance as well as the IRE. One or more parameters of the launch request for the parent compute instance may indicate that a child IRE is to be established within the parent compute instance (and, in some cases, properties of such a child IRE) in such embodiments.

A VerifyIREConfig request 420 may be submitted by a client 401 to initiate the process of attestation/analysis/verification of the software state of the IRE in some embodiments, with an identifier of the IRE being included as a parameter of the request. In response, a security manager implemented within a virtualization management component of the host at which the IRE is set up may perform a set of measurements on the software, as discussed earlier, and generate a response (SecurityMgrResponse 422) in such embodiments. The SecurityMgrResponse 422 may include the results of the attestation/analysis/verification, as well as evidence of the identity of the security manager, the IRE and/or the parent compute instance in some embodiments.

A client 401 may establish a secure communication session or channel with the IRE, e.g., using one or more messages indicated by EstablishSecureSessionWithIRE 424. A handshake protocol conceptually similar to a TLS session establishment handshake may be employed in some embodiments—e.g., both parties to the session may obtain indications of the other party's identity, agree on a ciphersuite to be used, and so on. Messages of the handshake originating at the client 401 may be transmitted to a communication intermediary process CIP 462 of the parent compute instance ParentCI 461, and from that CIP to the IRE 463; messages from the IRE 463 to the client may take the reverse path. After the secure communication session has been established, one or more security artifacts may optionally be transmitted by the client to the IRE in one or more messages (indicated by TransmitSecurityArtifactViaSecureSession 426) of the session, e.g., in encrypted form such that the artifacts cannot be extracted or obtained by any software of the parent CI other than software running in the IRE. After the artifacts have been decrypted at the IRE, computations of the client's application that require the use of the artifact may be performed at the IRE in various embodiments as discussed above.

Clients 401 may request metrics pertaining to an IRE, such as resource utilization metrics, data transfer metrics, etc., specific to the IRE and the like using a GetIREMetrics request 431 in some embodiments, and the requested metric sets 433 may be provided by the VCS in response. In some embodiments, debugging information of an IRE (e.g., a call stack associated with a process that exited unexpectedly, or a dump of memory of the IRE) may be requested via a GetIREDebugInfo request 437, and the requested information may be provided if available via a DebugInfo message

439. In at least some embodiments, a client may request, via a TerminateIRE request 441, that a particular IRE be shut down or killed. Such a termination may be performed, and an IRE-terminated response 443 may be provided in some such embodiments. Note that other types of programmatic interactions associated with isolated run-time environments may be supported in at least some embodiments, and some of the types of requests shown in FIG. 4 may not be supported in at least one embodiment.

Example Categories of Compute Instances

Figure 5:
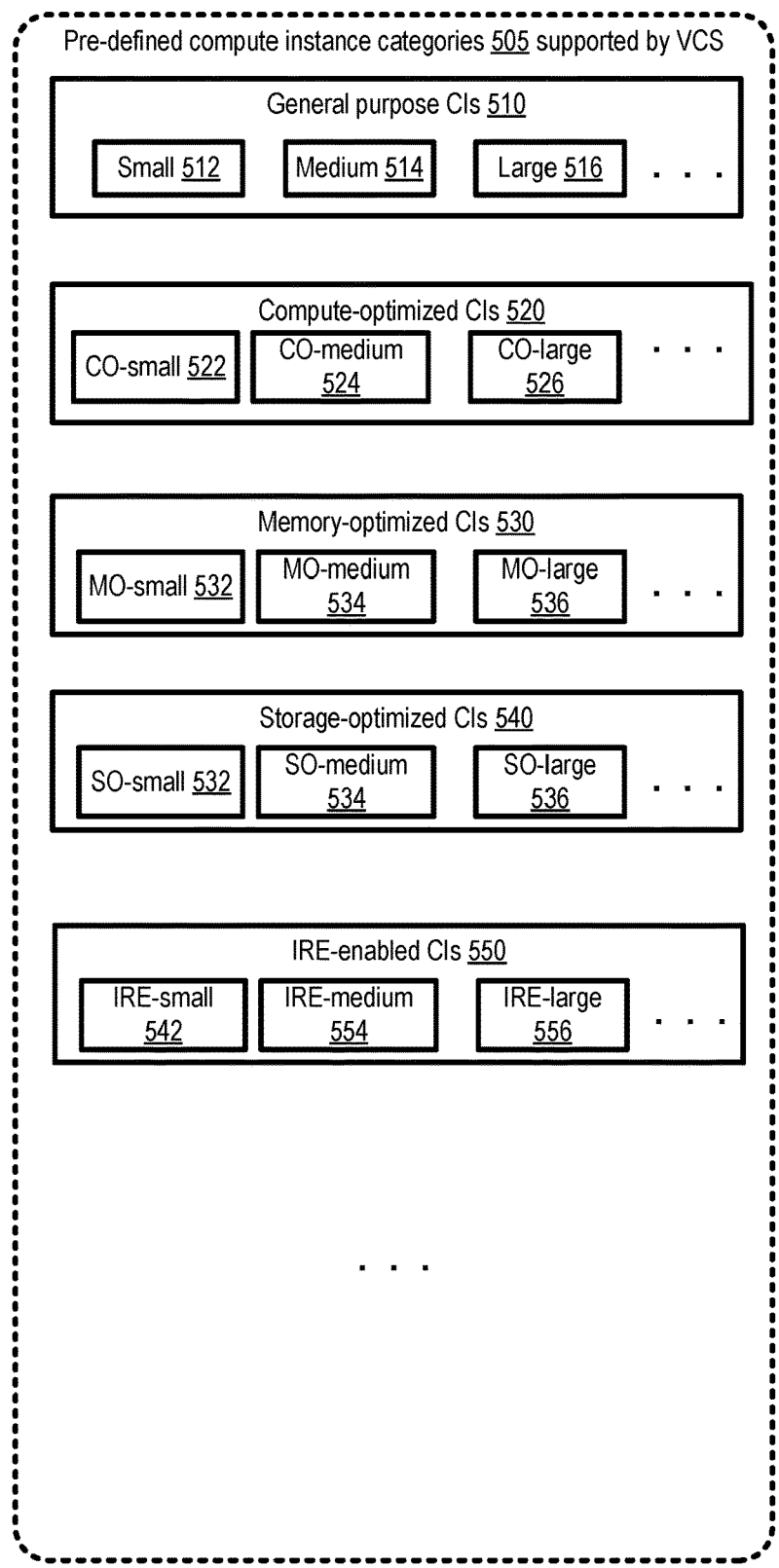
FIG. 5 illustrates example categories of compute instances that may be established at a virtualized computing service, according to at least some embodiments.

In some embodiments, a virtualized computing service may enable clients to select from among a variety of types of supported compute instances, some of which may enable clients to request the establishment of isolated run-time environments of the kind introduced above. FIG. 5 illustrates example categories of compute instances that may be established at a virtualized computing service, according to at least some embodiments. When requesting a compute instance, in the depicted embodiment a VCS client may specify the particular pre-defined category 205 to which the requested compute instance (CI) is to belong. In some embodiments, the VCS may also allow clients to provide client-defined specifications for a requested CI, e.g., in scenarios where the pre-defined categories do not meet client requirements.

The standardized set of compute instance categories 505 may be subdivided into families, such as a general-purpose CIs family 510, a compute-optimized CIs family 520, a memory-optimized CIs family 530, a storage-optimized CIs family 540, an IRE-enabled family 550 (compute instances that can support isolated run-time environments similar to those introduced above), and so on in some embodiments. Depending on the known or estimated needs of the application for which a given CI is to be used by the client, a CI type from the appropriate family may be selected. The relative resource capabilities for the different CI types may be expressed using units selected or defined by the VCS— e.g., for computing, units such as virtual CPUs that are roughly performance-equivalent to a particular well known processor running at a particular clock speed may be defined. The family may be selected based on qualitative considerations (e.g., answers to question such as "Do the applications to be run on the CIs require computations to be performed using security artifacts such as encryption keys?", "Is the application mix more memory-intensive or more compute-intensive?", etc.), while the particular CI type within the family (e.g., small 512 vs. medium 514 vs. large 516 in the general purpose family) may be selected based on considerations such as desired performance levels, cost, and so on. Compute-optimized CIs 520, such as CO-small CIs 522, CO-medium CIs 524, or CO-large CIs 526 may, for example, be implemented using hosts with more and/or faster processors or cores than the general purpose CIs in the depicted embodiment. In the memory-optimized CIs 530 such as MO-small CIs 532, MO-medium CIs 534, or MO-large CIs 536, the amount of memory (e.g., the number of gigabytes of memory per virtual CPU) relative to the computing capability may be higher than in compute-optimized CIs 520 or the general-purpose VMs. Similarly, in the storage optimized family 540 comprising SO-small CIs 532, SO-medium CIs 534, and SO-large CIs 536, the ratio of local storage to compute power (e.g., number of gigabytes of local solid-state device (SSD) storage per virtual CPU) may be higher than in the other families.

The IRE-enabled CIs 550, such as the IRE-small CIs 542, the IRE-medium CIs 554 or the IRE-large CIs 556, may differ from one another in their memory and/or computing capabilities as well. In at least one embodiment, the virtualization hosts of the VCS may include several different types of virtualization management software and/or or offloading hardware combinations: e.g., some hosts may have a hypervisor H1 and no offloading cards for virtualization management tasks, other hosts have a different hypervisor H2 and one or more offloading cards which perform networking and storage-related virtualization management tasks, and so on. In one such embodiment, IRE-enabled CIs 550 may be established on a subset of the VCS virtualization hosts that have a particular hypervisor designed or hardened for compute instances at which sensitive data is to be processed. In some embodiments, a special category of IRE-enabled CIs may not necessarily be defined or made available to VCS clients; instead, IREs may be set up at CIs of one or more other pre-defined categories or at client-specified custom CIs that do not belong to the pre-defined categories.

Example Requests to Instantiate Isolated Run-Time Environments

Figure 6:
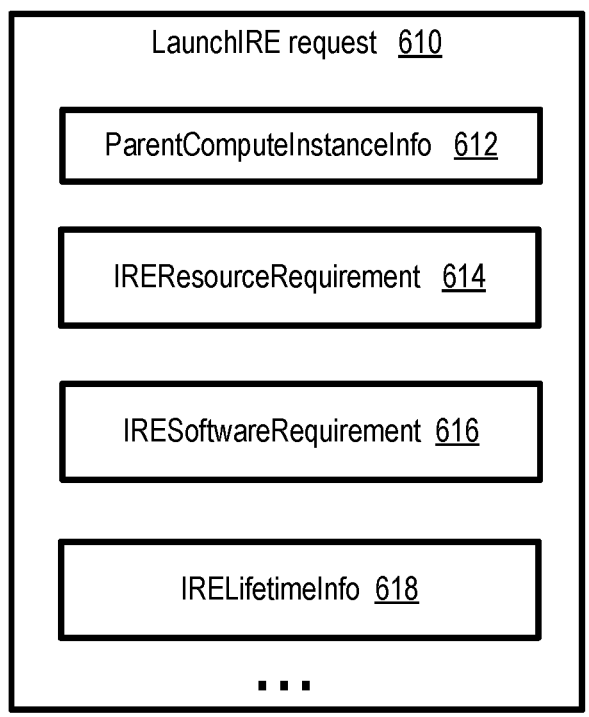
FIG. 6 illustrates examples elements of a request to instantiate an isolated run-time environment, according to at least some embodiments.

FIG. 6 illustrates examples elements of a request to instantiate an isolated run-time environment, according to at least some embodiments. A LaunchIRE request 610, which may be submitted by a client of a virtualized computing service (VCS) similar to VCS 110 of FIG. 1, may comprise a number of fields or elements in the depicted embodiment. A ParentComputeInstanceInfo field 612 may indicate the identifier of a previously-created compute instance in some embodiments. In other embodiments, the ParentComputeInstanceInfo field may indicate a category of compute instances (e.g., such as the IRE-small, IRE-medium or IRE-large categories discussed in the context of FIG. 5), and in response to the request 610 the VCS may be responsible for first launching an instance of that category, and then launching an IRE within it—that is, a single request may result in the establishment of the parent CI as well as the IRE within the parent CI. In one embodiment, instead of specifying a pre-existing category of CIs, the client may indicate a combination of desired properties of the parent CI (e.g., a processing capacity, a memory size, an operating system version, and so on) via the ParentComputeInstanceInfo field 612.

In some embodiments, an IREResourceRequirement field 614 may be used to indicate the fraction (or actual amount) of the parent CI's resources that are to be set aside for exclusive use by the IRE. For example, in one embodiment in which the parent CI has G gigabytes allocated, the field 614 may indicate that 25% of the parent CI's memory is to be set aside for the IRE. In other embodiments, instead of specifying a fraction or percentage, the absolute amount of memory (and/or other resources, such as virtual CPUs or the like) to be set aside for the IRE may be indicated.

The desired software stack to be used for the IRE, such as an operating system version, a set of application programs and the like to be included in the IRE, may be indicated via the IRESoftwareRequirement field 616 in the depicted embodiment. In some embodiments, a virtual machine image to be used for the IRE, or a software container to be used for the IRE, may be indicated via an identifier. In some embodiments, a virtual machine image or other executable object for launching the IRE may be transmitted to the VCS in a separate interaction; such an object may be stored for example at a repository of the VCS control plane, or using storage of the parent CI.

According to at least one embodiment, a client may indicate guidelines about how long the IRE is to remain operational, e.g., via an IRELifetimeInfo parameter 618 of the launch request 610. For example, to further reduce the probability of the security artifacts (which may be provided to the IRE and used at the IRE for computations on behalf of the VCS client as discussed earlier) being obtained or accessed by unauthorized entities, a client may indicate that an IRE is to be automatically terminated T minutes after it is launched. In other embodiments, a client may indicate that the IRE is not to be terminated in advance of its parent CI. In some embodiments, other client preferences regarding IRE configuration and usage may be indicated via parameters of IRE launch requests than those shown in FIG. 6. In at least some embodiments, default values for some or all of the parameters of IREs may be used by the VCS in a scenario where a client does not provide values—e.g., a default amount of memory may be set aside for the IRE, a default maximum lifetime parameter setting may be used for an IRE, and so on.

Example Responses to Configuration Verification Queries

Figure 7:
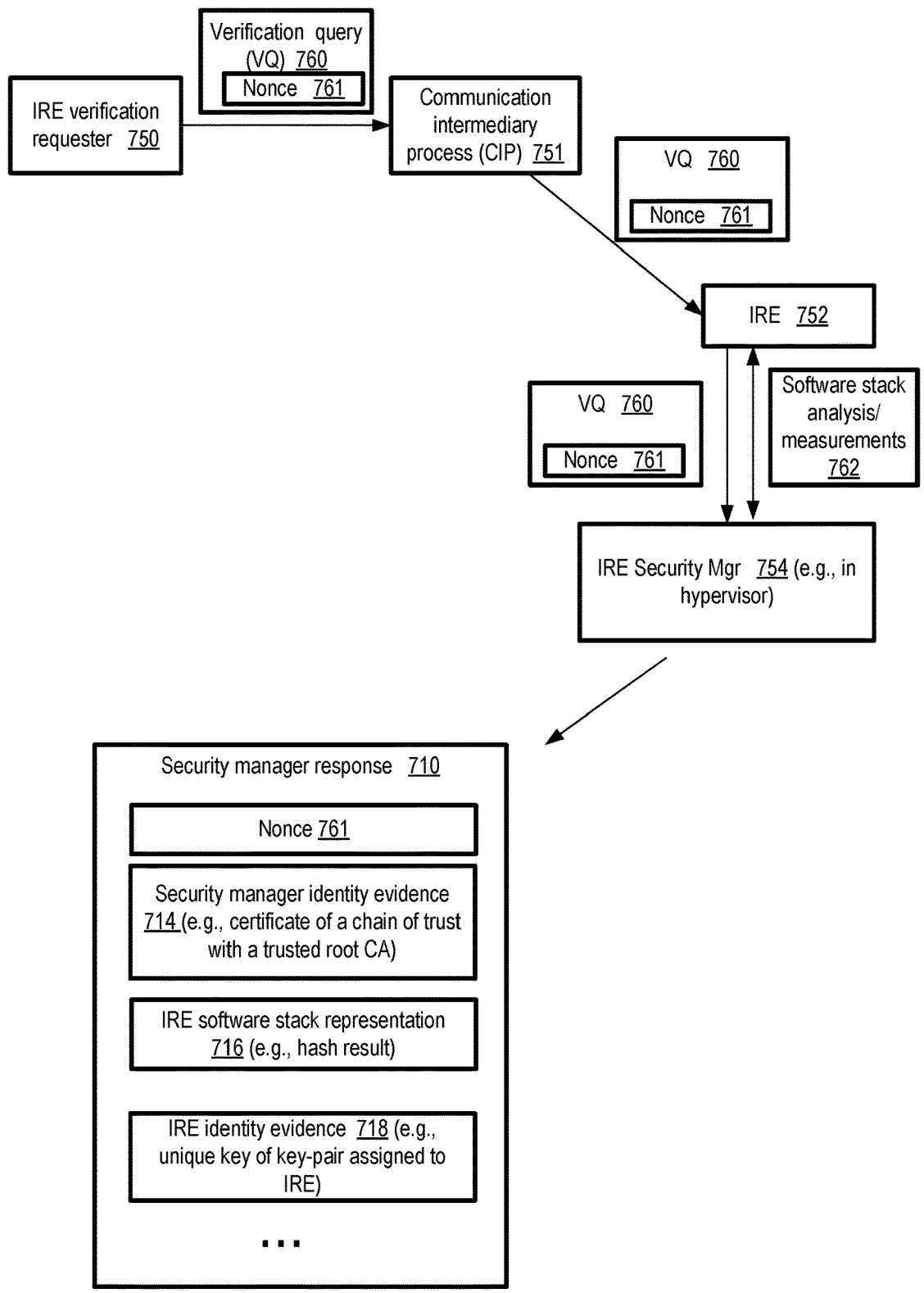
FIG. 7 illustrates example elements of a response to a configuration verification query pertaining to an isolated run-time environment, according to at least some embodiments.

As mentioned earlier, in at least some embodiments a VCS client may submit a query or request to analyze or verify the software configuration of an IRE set up on behalf of the client, e.g., to ensure that the software state of the IRE matches what the client expects. FIG. 7 illustrates example elements of a response to a configuration verification query pertaining to an isolated run-time environment, according to at least some embodiments. In the depicted embodiment, an IRE verification requester 750 may submit a verification query 760 about an IRE that has been established for the client (similar to the VerifyIREConfig request shown in FIG. 4) via a programmatic interface to the parent compute instance of the IRE, or to the VCS control plane. Such verification queries may also be referred to as configuration analysis queries or requests. The query may identify the IRE and/or the parent compute instance, and may include a random number referred to as a nonce 761 in at least some embodiments. The nonce may be included in the query by the client 750 (and also stored locally by the client) as a token that can be used to verify (by comparing it to a nonce included in the response to the query) that the response generated by the VCS is in fact a response to the particular query sent by the client.

At the parent CI of the IRE, the VQ 760 may be received at a communication intermediary process 751, similar to CIP 248 of FIG. 2, and transmitted via a local communication channel to the targeted IRE 752 whose state is to be verified in the depicted embodiment. The IRE 752 may in turn pass the VQ 760 to an IRE security manager 754 (e.g., a subcomponent of the hypervisor at the host at which the parent CI is instantiated). The IRE security manager 754 may then perform analysis/measurement 762 of the IRE 752, and generate a response 710 that is sent back to the requester 750 in the depicted embodiment. The response 710 may include, among other elements, the nonce 761 that was included in the request 760, evidence 714 of the security manager's identity, a representation 716 of the software stack or state of the IRE (e.g., including a result of the analysis/measurements 762), and/or evidence of the IRE's identity 718 in at least some embodiments. In some embodiments, a respective certificate of a train of trust rooted at a well-known and trusted certificate authority (CA) may be provided as evidence of the security manager's identity and trustworthiness, and/or as evidence of the IRE's identity. In other embodiments, a key of an asymmetric cryptographic key pair may be used as identity evidence of the security manager and/or the IRE. In at least one embodiment, a hash function may be applied to at least a portion of the software installed at the IRE, and the result of the hash function may be included in the representation 716. The hash result may, for example, be compared to a set of one or more independently-obtained hash results available to the verification requester, where the independently-obtained hash results correspond to respective acceptable software configurations. If the hash result representing the IRE matches one of the other hash results, the IRE's software configuration may be deemed acceptable in some embodiments; otherwise, the IRE may be deemed unacceptable. In one embodiment, the comparison of the IRE's hash result with acceptable hash results may be performed at the security manager, and the response 710 may include a result of such a comparison instead of or in addition to the IRE's hash result.

Example Migrations of Instances with Isolated Run-Time Environments

Figure 8:
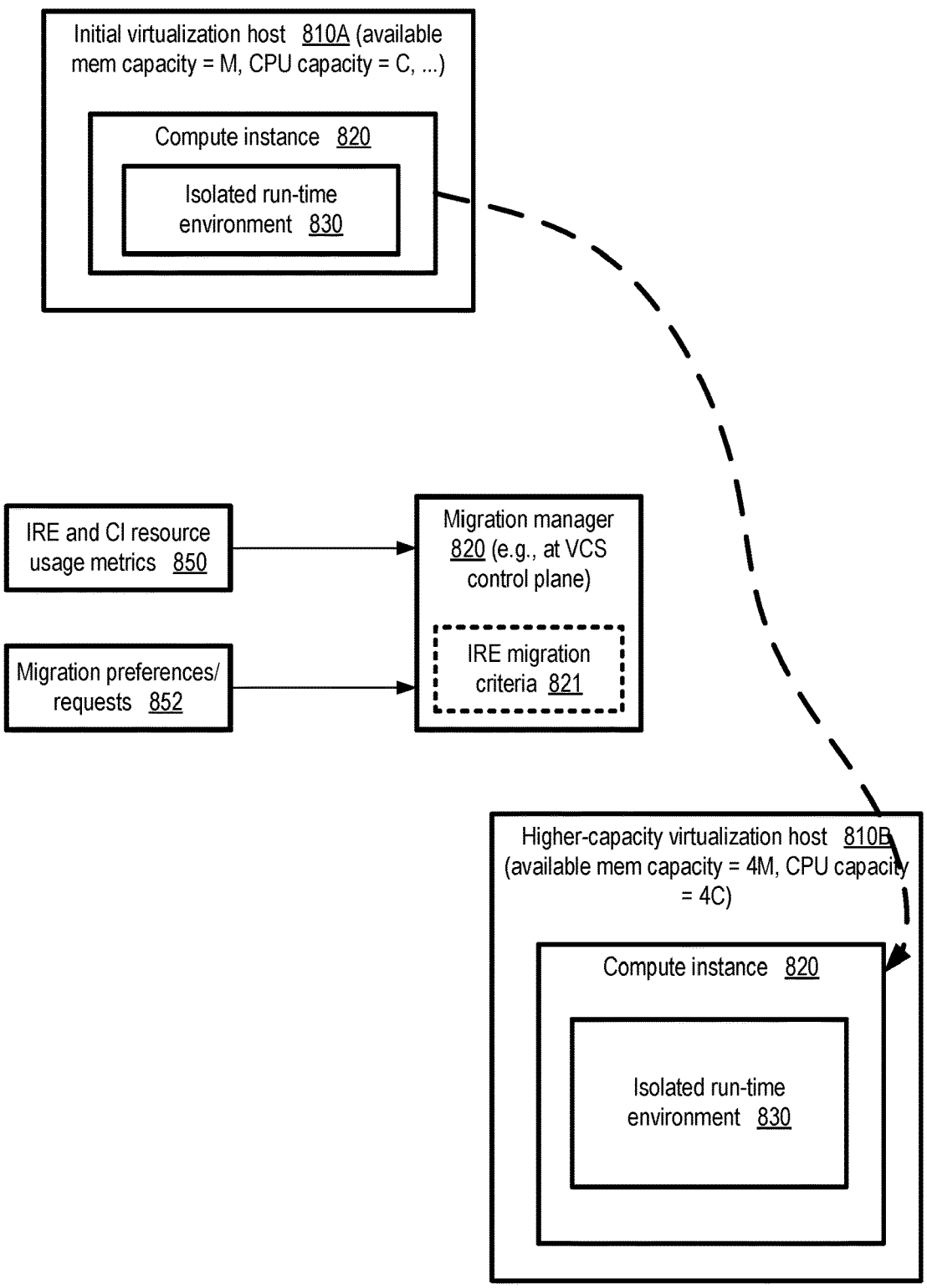
FIG. 8 illustrates an example live migration of a compute instance comprising an isolated run-time environment, according to at least some embodiments.

In some embodiments, the resource needs of an isolated run-time environment (IRE) and/or its parent compute instance (CI) may change over time. FIG. 8 illustrates an example live migration of a compute instance comprising an isolated run-time environment, according to at least some embodiments. An initial virtualization host 810A selected for the parent CI 820 of an IRE 830 may for example have an available memory capacity M and an available CPU capacity C in the depicted embodiment.

After the IRE has been established, resource usage metrics 850 of the IRE (and/or of the parent CI 820) may be collected and obtained at a migration manager 820 (e.g., part of the control plane of a VCS similar to VCS 110 of FIG. 1) in the depicted embodiment. Note that at least in some implementations, respective sets of metrics such as CPU utilization, memory utilization and the like may be collected separately with respect to individual ones of the IREs established at a given compute instance, from corresponding metrics of the parent compute instance, so that the respective resource usage profiles of the IREs and the parent compute instances can be analyzed. In some embodiments, a client on whose behalf the IRE is set up may submit one or more migration-related requests 852 to the VCS, indicating for example the triggering conditions (e.g., an average CPU utilization of over X % at the IRE for some period of time) that should lead to the transfer of the compute instance and the IRE to a different virtualization host. In other embodiments, such IRE migration criteria 821 may be determined at the VCS without specific input or preferences indicated by clients.

Based on analysis of the resource usage metrics and/or on programmatic requests from the VCS client, in at least some embodiments the parent compute instance and 820 (together with its constituent IRE(s) 830) may be moved to a higher-capacity virtualization host 810B. For example, the host 810B may have 4× the memory capacity of the original host 810A, and 4× the compute capacity in some example scenarios. At the higher-capacity host, the now-migrated parent compute instance may be assigned a new (e.g., larger) set of resources, from which a new (e.g., larger) subset may be assigned for exclusive use of the migrated IRE(s). For example, if G1 gigabytes of memory were allocated to an IRE 830 prior to migration out of its parent compute instances 4*G1 gigabytes, 2*G1 gigabytes may be set aside for the IRE 830 post-migration (e.g., from a larger pool of 8*G1 gigabytes assigned to the migrated version of the parent compute instance).

In at least one embodiment, it may be the case that a parent CI and its child IRE may be migrated to a host with lower resource capacity available than the original host. Parent compute instances and their IREs may be migrated as a unit in at least some embodiments as indicated in FIG. 8;

e.g., it may not be possible to migrate an IRE without also migrating its parent CI to the same destination host. In other embodiments, it may be possible to migrate IREs separately from their parent CIs.

Methods for Configuring and Using Isolated Run-Time Environments

Figure 9:
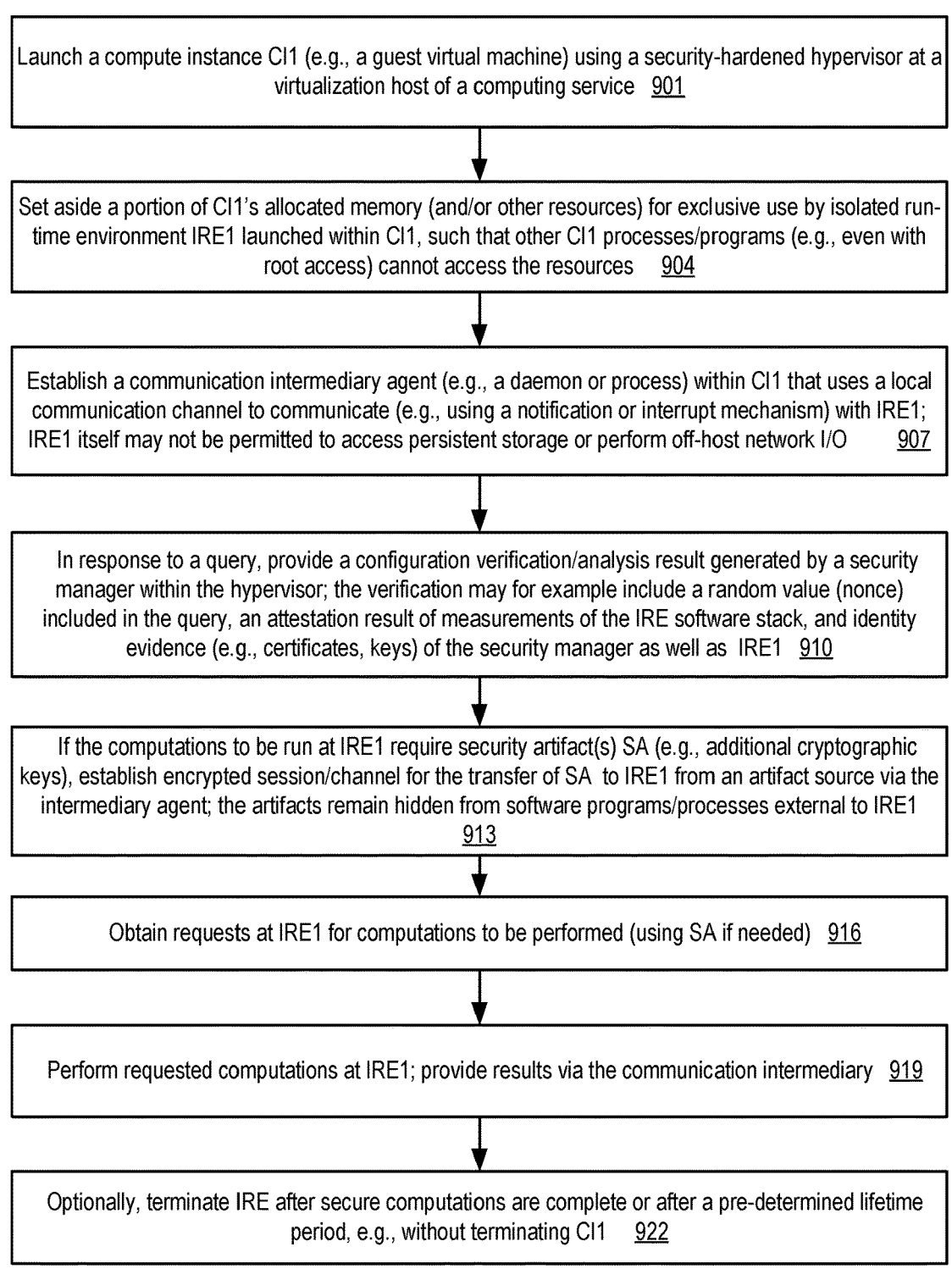
FIG. 9 is a flow diagram illustrating aspects of operations that may be performed to establish and use isolated run-time environments within compute instances of a virtualized computing service, according to at least some embodiments.

FIG. 9 is a flow diagram illustrating aspects of operations that may be performed to establish and use isolated run-time environments within compute instances of a virtualized computing service, according to at least some embodiments. As shown in element 901, a compute instance CI1 (such as a guest virtual machine) may be launched at a virtualization host of a network-accessible computing service. In at least some embodiments, a security-hardened hypervisor may be set up at the host—for example, before the hypervisor is instantiated, firmware of the host may be verified, a secure boot process may be initiated at the host using a virtualization management offloading component, and so on. The hypervisor and/or other virtualization management components of the host) may in turn assign or allocate a portion of the host's memory and/or other resources (e.g., virtual CPUs) to the compute instance, e.g., as part of the launch procedure of the compute instance.

At some point after CI1 is launched, a child isolated run-time environment IRE1 may be launched or instantiated within CI1 (e.g., using resources that were allocated earlier to CI1) in various embodiments (element 904). As such, CI1 may be referred to as a parent compute instance of IRE1. At least a portion of the particular software stack to be used at IRE1 may be specified or selected by the client on whose behalf IRE1 is set up in various embodiments—e.g., executable versions of programs to be run in IRE1 may be indicated by the client, a machine image or software container image to be used for IRE1 may be indicated by the client, and so on. A portion of the memory that was assigned to CI1 may be carved out or segregated, for example, by the hypervisor, and assigned for exclusive use by processes/programs running within IRE1 in at least some embodiments. In some embodiments, a subset of other types of resources of CI1, such as virtual CPUs, may also be set aside for exclusive use by IRE1. The subset of the parent instance's resources that is set aside for the child run-time environment may not be accessed from other programs/processes running in CI1, although a region of memory may be shared by IRE1 and a communication intermediary process set up within CI1 in at least some embodiments as discussed below.

In the depicted embodiment, a communication intermediary agent (e.g., an operating system daemon or process) may be established within CI1 for managing interactions between IRE1 and other communication endpoints, data destinations or data sources (element 907). A number of configuration settings that place severe restrictions on IRE1's own ability to initiate communications may be generated and/or stored at the virtualization host in various embodiments, resulting in the intermediary being used for any such communications. For example, network communication with endpoints outside the host may be prohibited at IRE1, and/or access to persistent storage may be prohibited at IRE1 in some embodiments by the configuration settings. In some embodiments, for example, the configuration settings may comprise a set of logical or software devices, and the set of devices that are established may exclude devices required for over-the-wire networking, I/O (reads or writes) to file systems, storage volumes and so on. In at least some embodiments, a local shared-memory-based communication channel may be used for transferring data between the intermediary and IRE1—for example, one or more buffers in a region of shared memory mapped to both the intermediary process and a process within IRE1 may be set up. A notification-based or interrupt-based mechanism may be employed in some embodiments for such data transfers, e.g., as opposed to a polling-based technique. For example, when data is to be transferred to IRE1, the intermediary process may write the inbound data to a shared memory buffer and cause the equivalent of an interrupt to be delivered to IRE1, and when data is to be transferred from IRE1, the outbound data may be written to a shared memory buffer by a process within IRE1, and a similar interrupt-like notification may be directed to the intermediary, causing the intermediary to in turn transfer the outbound data on towards its intended destination.

After IRE1 has been established, in at least some embodiments a request or query to verify or analyze the configuration of IRE1 may be received, e.g., from a client on whose behalf IRE1 was set up. In response to such a query, a result obtained from one or more tests, measurements or analysis performed by a security manager on IRE1's software stack may be provided (element 910). In at least one embodiment, the security manager may be implemented as a subcomponent of the hypervisor running at the virtualization host. In other embodiments, the security manager may run elsewhere, e.g., as a thread of execution within a virtualization management offloading card. In some embodiments, the tests or measurements may comprise an attestation of the software stack of IRE1, and the test results may include a value or values generated by applying one or more selected hash functions or other transformation functions to at least a portion of IRE1's software. In some embodiments, a result message generated by the security manager may comprise, for example, a random value or nonce included in the configuration verification query (which can be used by the query submitter to check that the response corresponds to the query that was submitted), an attestation result corresponding to IRE 1's software stack, and identity information/evidence (such as a digital certificate, and/or one or more cryptographic keys) of the security manager itself, and/or identity information pertaining to IRE1. The result message may be conveyed from the security manager via any of various paths to the query submitter in different embodiments—e.g., along a path that includes IRE1 and the communication intermediary, or along a path that does not use IRE1 or the intermediary.

In some cases, as discussed above, the applications or computations to be run at IRE1 may require one or more security artifact(s) such as additional cryptographic keys. In such scenarios, after the configuration verification results are accepted by the query submitter (which may for example involve comparing the IRE1 attestation results to a set of acceptable results previously generated or obtained by the submitter), in various embodiments a secure (e.g., encrypted) communication channel or session may be established between the client and IRE1 via the intermediary (element 913). In one embodiment, the submitter of the query may send a message to IRE1, CI1, and/or to the security manager indicating that the configuration verification results are acceptable. In other embodiments, the acceptance may be indicated implicitly: for example, the attempt to establish the secure channel may indicate that the verification/attestation results have been accepted, and a separate message indicating acceptance explicitly may not be needed. Any of a number of different techniques may be used to establish the secure session/channel in various embodiments. For example, the equivalent of a TLS handshake mechanism, involving the transmission of a "TLS client hello" message or the equivalent, a "TLS server hello" message or the equivalent, etc., may be used to set up the secure channel in some embodiments. Using the secure channel, one or more security artifacts of a client application (e.g., cryptographic keys to be used for the application's computations at IRE1, distinct from the keys that may have been used earlier in the process of verifying IRE1 and setting up the channel to communicate with IRE1) may be transferred to IRE1 in the depicted embodiment. The artifacts may remain inaccessible to processes/programs of the virtualization host that are not part of IRE1 in at least some embodiment—e.g., a key known within IRE1, not provided to the communication intermediary or any other process outside IRE1, may be needed to decrypt the artifact(s). Note that in some embodiments, a client on whose behalf IRE1 is established may designate a third-party artifact source (such as a key management service of a provider network), and the secure communication channel may be set up between the artifact source and IRE1 instead of between a client's computing device and IRE1. In some cases, the operations to be performed at IRE1 may not need a security artifact that has to be transferred using a secure communication channel.

One or more requests to perform computations of the client's application (using the security artifacts if needed) may be received at IRE1 (element 916), e.g., via the intermediary agent, and the requested computations may be performed at IRE1 (element 919). The results of the computations may be transmitted via the intermediary to one or more destinations in various embodiments. Note that the requests for the computations may be generated, for example, by processes running within CI1 in some cases, and similarly, the results may be provided to processes running within CI1.

In some embodiments, after a set of secure application computations, potentially involving the use of the security artifact(s), is completed, and/or after a timeout representing a maximum permitted lifetime duration of IRE1 expires, IRE1 may be de-configured or terminated (element 922). In at least some embodiments, other programs/processes may continue running within CI1 after IRE1 is de-configured or terminated. In one embodiment, resources that were previously taken away from CI1 and designated for exclusive use by IRE1 may be returned to CI1 after IRE1 is terminated.

It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations.

Use Cases

The techniques described above, of setting up child isolated run-time environments of compute instances at a virtualized computing service, such that the configuration of the run-time environments can be attested or verified by a trusted hypervisor, may be useful in a variety of scenarios. As more and more applications are migrated to provider network environments, and the number of applications from different sources running at a given host increases, clients of the provider network may wish to ensure that the probability of leaking or compromise of security artifacts (such as cryptographic keys used for application computations) is minimized. By using the described approaches, in which provider network clients may use familiar programming paradigms such as industry standard software containers, the clients may be able to enhance the security of such artifacts without having to rely on customized hardware, and without having to modify their applications (e.g., by utilizing special security-related instructions added to an instruction set).

The security of applications that do not require such artifacts may also be enhanced by running them at verified execution platforms. For example, a user may have a particular program that is certified to analyze a particular set of data. The user may run that program inside of an isolated run-time environment as described herein and may provide the particular set of data to the program inside of the isolated run-time environment, in order to ensure that the certified program (and not others) have access to the data.

Illustrative Computer System

Figure 10:
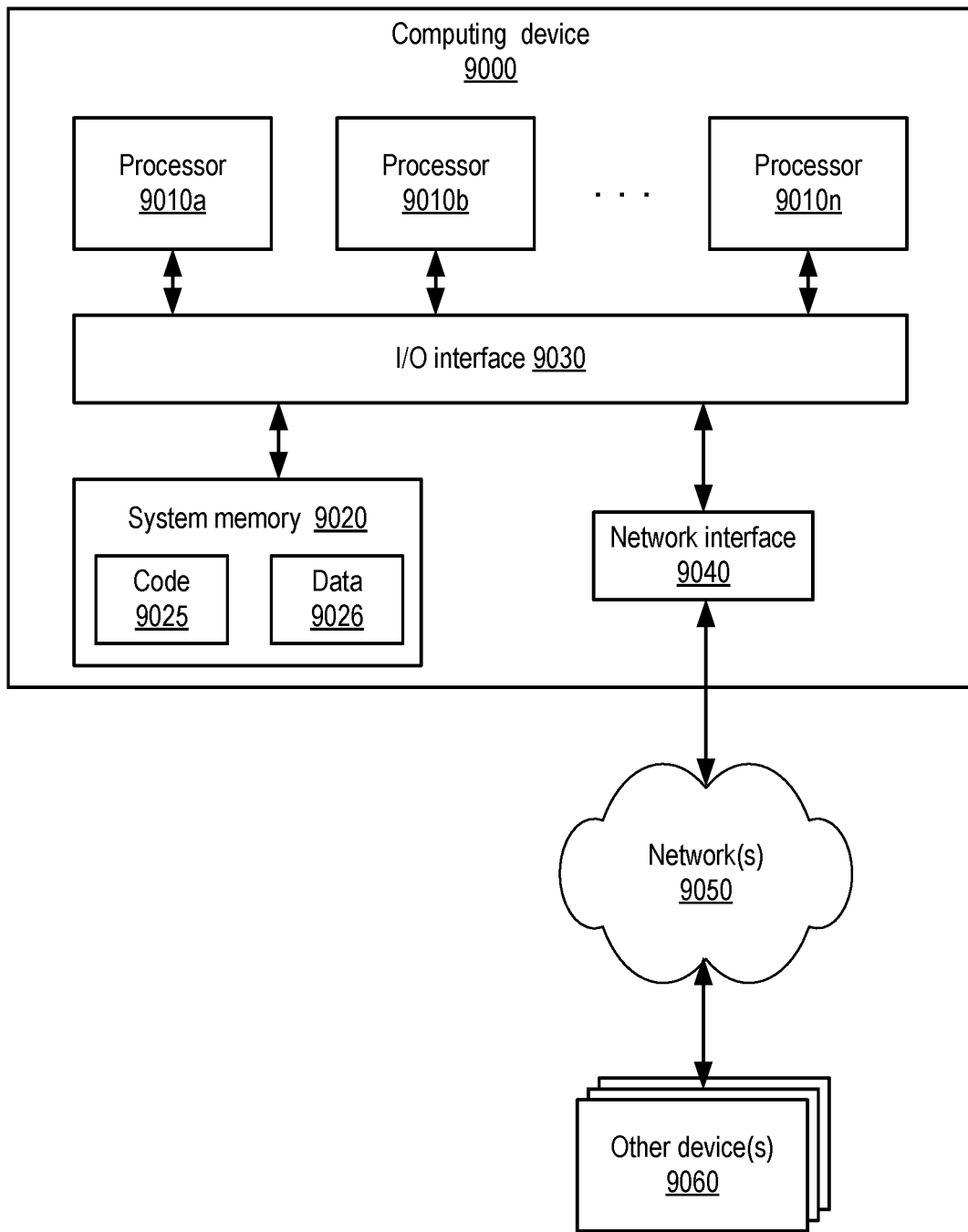
FIG. 10 is a block diagram illustrating an example computing device that may be used in at least some embodiments.

In at least some embodiments, a server that implements one or more of the techniques described herein, including for example hypervisors at virtualization hosts, compute instances with communication intermediary processes/daemons, isolated run-time environments instantiated within compute instances, control plane and/or data plane components of network-accessible services and the like may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of a virtualized computing service;
wherein the one or more computing devices include instructions that upon execution on or across one or more processors cause the one or more computing devices to:
launch a compute instance at a virtualization host, wherein a portion of memory of the virtualization host is allocated to the compute instance;
segregate a first subset of the portion of memory for a first child isolated run-time environment of the compute instance, wherein direct network communications with any other endpoints outside the virtualization host are prohibited from the first child isolated run-time environment, and wherein the first subset of the portion of memory is inaccessible from programs running outside the first child isolated run-time environment;
establish a communication intermediary process within the compute instance for interactions with the first child isolated run-time environment;
cause an attestation of a configuration of the first child isolated run-time environment to be initiated by a security manager established at a virtualization management component of the virtualization host that is external to the compute instance;
provide via the communication intermediary process, to one or more destinations, (a) a result of the attestation and (b) an indication of an identity of the security manager;
determine that the result of the attestation has been accepted;

obtain, at the first child isolated run-time environment of the compute instance, an encrypted security artifact transferred from an established encrypted channel via the communication intermediary process, wherein decryption of the security artifact requires a key that is inaccessible to (a) the communication intermediary process established within the compute instance and (b) other programs running at the compute instance; and perform, at the first child isolated run-time environment, one or more computations using the security artifact and the first subset of the portion of memory.

2. The system as recited in claim 1, wherein the one or more computing devices include further instructions that upon execution on or across one or more processors further cause the one or more computing devices to:

determine, based at least in part on a parameter of a launch request for the compute instance, that the first child isolated run-time environment is to be established within the compute instance.

3. The system as recited in claim 1, wherein the one or more computing devices include further instructions that upon execution on or across one or more processors further cause the one or more computing devices to:

determine, based at least in part on a programmatic request received after the compute instance is launched, that the first child isolated run-time environment is to be established within the compute instance.

4. The system as recited in claim 1, wherein configuration settings of the first child isolated run-time environment do not permit input/output (I/O) operations to or from persistent storage.

5. The system as recited in claim 1, wherein the one or more computing devices include further instructions that upon execution on or across one or more processors further cause the one or more computing devices to:

instantiate a second child isolated run-time environment of the compute instance at the virtualization host, wherein a second subset of the portion of memory is segregated for exclusive use from the second child isolated run-time environment.

6. A method, comprising:

performing, at one or more computing devices:

assigning, by a hypervisor of a virtualization host, for exclusive use by an isolated run-time environment set up at the virtualization host, a subset of a portion of resources of the virtualization host allocated to a parent compute instance of the isolated run-time environment, wherein direct network communications with any other endpoints outside the virtualization host are prohibited from the isolated run-time environment, and wherein the subset of the portion of resources is inaccessible from programs running outside the isolated run-time environment;

establishing a communication intermediary process within the parent compute instance for interactions with the isolated run-time environment;

providing via the communication intermediary process, to one or more endpoints, (a) a result of a configuration analysis of the isolated run-time environment and (b) an indication of an identity of a security manager, wherein the configuration analysis of the isolated run-time environment of the parent compute instance is performed by the security manager of the hypervisor that is external to the parent compute instance or another component that is external to the parent compute instance;

obtaining, at the isolated run-time environment of the parent compute instance, subsequent to an acceptance of the result of the configuration analysis, an encrypted application security artifact transferred from an established encrypted channel via the communication intermediary process, wherein decryption of the application security artifact at the virtualization host requires a key inaccessible to (a) the communication intermediary process and (b) other programs running at the parent compute instance; and performing, at the isolated run-time environment, one or more computations using the application security artifact and the subset of the portion of resources.

7. The method as recited in claim 6, further comprising performing, at the one or more computing devices:

determining, based at least in part on a parameter of a launch request for the parent compute instance, that the isolated run-time environment is to be established within the parent compute instance.

8. The method as recited in claim 6, further comprising performing, at the one or more computing devices:

determining, based at least in part on a programmatic request received after the parent compute instance is launched, that the isolated run-time environment is to be established within the parent compute instance.

9. The method as recited in claim 6, wherein configuration settings of the isolated run-time environment do not permit network communications between the isolated run-time environment and any other endpoints external to the isolated run-time environment.

10. The method as recited in claim 6, wherein configuration settings of the isolated run-time environment do not permit input/output (I/O) operations to or from persistent storage.

11. The method as recited in claim 6, further comprising performing, at the one or more computing devices:

instantiating, at the parent compute instance, the communication intermediary process configured to utilize a local communication channel to communicate with the isolated run-time environment.

12. The method as recited in claim 11, wherein utilizing the local communication channel comprises writing to one or more buffers of shared memory.

13. The method as recited in claim 6, further comprising performing, at the one or more computing devices:

obtaining, via a programmatic interface, an indication of a program to be run in the isolated run-time environment to perform the one or more computations; and causing an executable version of the program to be launched within the isolated run-time environment.

14. The method as recited in claim 6, further comprising performing, at the one or more computing devices:

causing, based at least in part on a lifetime parameter setting, one or more programs of the isolated run-time environment to be terminated.

15. The method as recited in claim 6, further comprising performing, at the one or more computing devices:

collecting one or more metrics of the isolated run-time environment;

in response to detecting that the one or more metrics meet a migration criterion, causing the parent compute instance to be migrated to another virtualization host; and assigning, for exclusive use from the isolated run-time environment after the migration of the parent compute instance, another subset of resources allocated to the migrated parent compute instance at the other virtualization host, wherein the other subset of resources includes a different amount of memory than was assigned to the isolated run-time environment prior to the migration.

16. A virtualization host of a network-accessible computing service, comprising:

one or more processors; and a memory;

wherein the memory comprises instructions that when executed on or across the one or more processors:

segregate, for an isolated run-time environment of a compute instance of the virtualization host, a subset of a portion of resources of the virtualization host allocated to the compute instance, wherein direct network communications with any other endpoints outside the virtualization host are prohibited from the isolated run-time environment, and wherein the subset of the portion of resources is inaccessible from programs running outside the isolated run-time environment;

instantiate, within the compute instance launched by a hypervisor of the virtualization host, the isolated run-time environment;

establish a communication intermediary process within the compute instance for interactions with the isolated run-time environment;

provide, via the communication intermediary process, (a) a result of a configuration analysis of the isolated run-time environment and (b) an indication of an identity of a security manager, wherein the configuration analysis of the isolated run-time environment of the compute instance is performed by the security manager of the hypervisor that is external to the compute instance;

obtain, at the isolated run-time environment of the compute instance, subsequent to an acceptance of the result of the configuration analysis, an encrypted application security artifact transferred from an established encrypted channel via the communication intermediary process, wherein decryption of the application security artifact at the virtualization host requires a key inaccessible to (a) the communication intermediary process and (b) other programs running at the parent compute instance; and perform, at the isolated run-time environment, one or more computations using the application security artifact and the subset of the portion of resources.

17. The virtualization host as recited in claim 16, wherein the memory comprises further instructions that when executed on or across the one or more processors:

store configuration settings of the isolated run-time environment, wherein the configuration settings do not permit network communications between the isolated run-time environment and endpoints external to the isolated run-time environment.

18. The virtualization host as recited in claim 16, wherein the memory comprises further instructions that when executed on or across the one or more processors:

store configuration settings of the isolated run-time environment, wherein the configuration settings do not permit access to persistent storage from the isolated run-time environment.

19. The virtualization host as recited in claim 16, wherein the memory comprises further instructions that when executed on or across the one or more processors:

instantiate, at the compute instance, the communication intermediary configured to utilize a local communication channel to communicate with the isolated run-time environment.

20. The virtualization host as recited in claim 16, wherein the memory comprises further instructions that when executed on or across the one or more processors:

de-configure, based at least in part on a lifetime parameter, the isolated run-time environment.

\* \* \* \* \*